J. R. SURRELL.
BOILER FURNACE AND FEED WATER HEATER.
APPLICATION FILED SEPT. 15, 1915.
Reissued Oct. 26, 1915. 14,003.
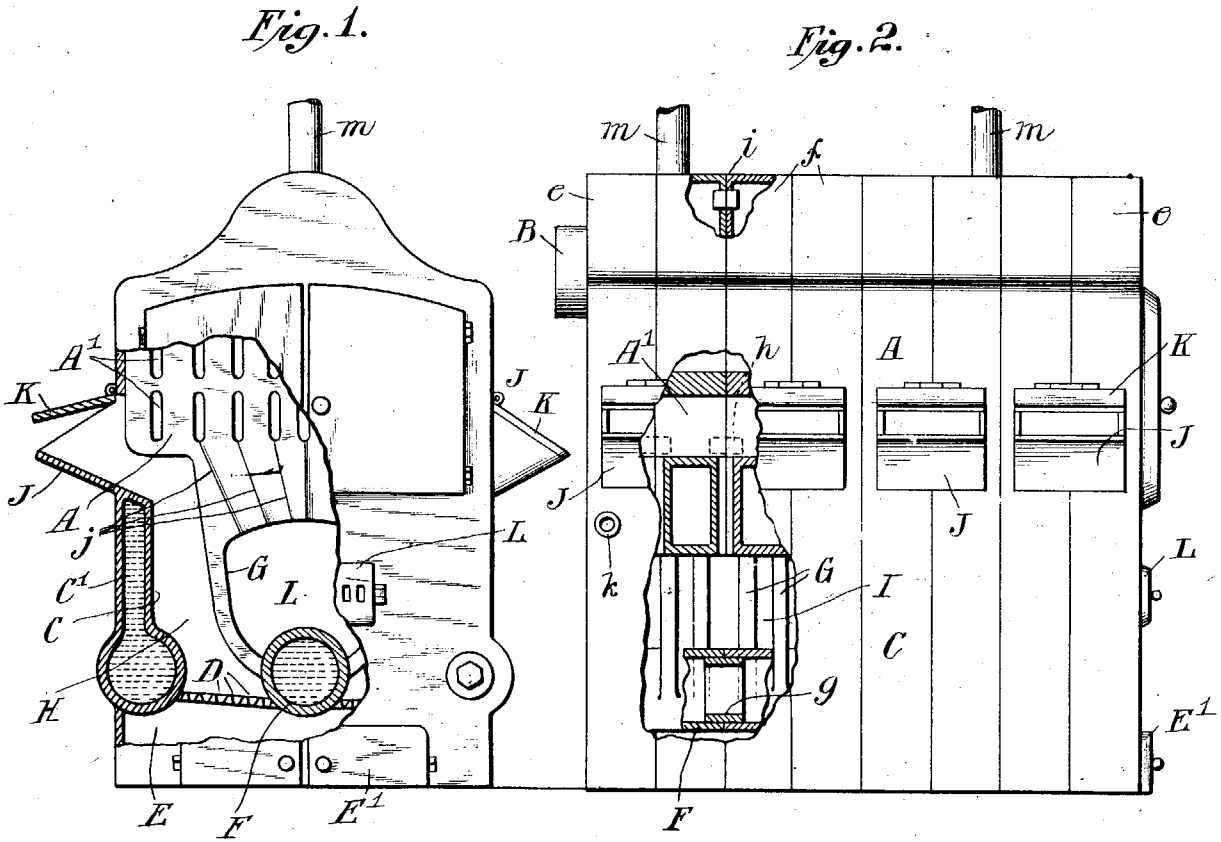
John Ralph Surrell Inventor:
by Frank C. Wentworth
his Atty.

UNITED STATES PATENT OFFICE.

JOHN RALPH SURRELL, OF NEW YORK, N. Y.

BOILER FURNACE AND FEED-WATER HEATER.

14,003. Specification of Reissued Letters Patent. Reissued Oct. 26, 1915.

Original application filed November 25, 1911, Serial No. 662,349. Original No. 1,067,494, dated July 15, 1913. Application for reissue filed July 14, 1915, Serial No. 39,932. Divided and this application for reissue filed September 15, 1915. Serial No. 50,913.

DIVISION B.

*To all whom it may concern:*

Be it known that I, JOHN RALPH SURRELL, a subject of the King of the United Kingdom of Great Britain and Ireland, residing at the borough of Manhattan, in the city, county, and State of New York, have invented certain new and useful Improvements in Boiler Furnaces and Feed-Water Heaters, of which the following is a specification, reference being had therein to the accompanying drawings, which form a part thereof.

My invention relates to boiler furnaces and feed water heaters and more particularly to a type thereof described in Letters Patent No. 1,067,494, granted to me under date of July 15, 1913, application for re-issue of which Letters Patent (from which this application is divided) having been filed on the 14th day of July, 1915, and given the Serial No. 39,932; and more particularly to those details of construction by which the invention of my aforesaid Letters Patent and re-issue application is adapted for use in connection with a low pressure plant especially adapted for use in connection with the heating system of a building.

It is not my intention in the present application to claim broadly the type of boiler and feed water heater shown in the accompanying drawings, such claims being incorporated in my aforesaid re-issue application, the invention of this appliaction residing more particularly in those details of construction wherein the low pressure structure differs from the details of construction of the embodiment of the invention especially adapted for use with high pressure plants.

While the structure of this invention embodies all of the essentials of the structure broadly claimed in my aforesaid re-issue application, it differs in certain details from the invention set forth in the specific claims of the said application. It is my intention, in the present application to claim specifically a structure embodying those characteristics which distinguish the specific structure of this application from the structure claimed specifically in my aforesaid application.

The object of the invention of this application is to produce a low pressure apparatus which may be formed of sections of small capacity capable of being readily cast, a plurality of these sections being connected in a manner to permit the free circulation of water through all of the sections of the boiler, the feed water heater and the water jacket, these portions of each section being connected, the connection in assembling the boiler being for the purpose of connecting one section with another as distinguished from the different portions of one section with those of the adjoining sections.

The invention of this application has all of the advantages of the invention broadly claimed in my aforesaid application in addition to those above specified.

My invention consists in the novel features of construction and combination of parts hereinafter set forth and described and more particularly pointed out in the claims hereto appended.

Referring to the drawings:—Figure 1 is an elevation of a low pressure boiler and feed water heater embodying those details by which it is adapted for use for low pressures, said structure being partly broken away; and Fig. 2 is a side elevation thereof broken away to disclose the details of construction by which the different sections are assembled.

Like letters refer to like parts in both of said views.

This invention has in common with the invention of my aforesaid patent, and re-issue application, a boiler A having heat areas, as the flues A'; a chimney connection B; furnace walls C having a water jacket C'; a fire grate D; a water drum F; water legs G opening directly into the boiler A and water drum F and an ash pit E having doors E'. It also has in common with said invention a fuel supply hopper J having movable closures K. The arrangement of parts considered broadly is as described in my aforesaid patent and application for re-issue thereof, a fuel combustion chamber H having a construction adjacent the hopper J being formed between the furnace, the boiler and the water legs, and an air and gas combustion chamber I being formed between the boiler, the water legs and the water drum. Communicating with this air and gas combustion chamber I is an opening in the furnace wall closed by the door L, which in the form of the invention shown has openings which may be closed by a damper plate. In this form of the invention as in that described in my aforesaid Letters Patent and application for re-issue thereof, the fuel combustion chamber H is of gradually increased width toward the bottom thereof and the air and gas combustion chamber is of increased width toward the top thereof.

The invention of the present application as heretofore stated differs from the form of the invention to which the specific claims of my aforesaid re-issue application are directed merely in those details by which a boiler and feed water heater embodying the essentials of the invention may be formed by a plurality of cast iron sections, the structure in its entirety being especially adapted for use in connection with the heating system of a building.

The apparatus herein specifically referred to is composed of two end sections *e*—*e'* and a plurality of intermediate sections *f* capable of being so assembled as to form the boiler A, the water drum F and the furnace C.

Each of these sections comprises a portion of the boiler A, a portion of the water drum F, and two or more water tubes or legs connecting said boiler and said drum portion. The portions of the water drum of adjoining sections *f* are connected by means of nipples *g*, and the boiler portions of said sections are connected with adjacent boiler sections, by means of nipples *h* and *i*, thus insuring uniform conditions throughout the boiler and permitting a free circulation of water throughout the same. Each of the sections *f* is also provided with a portion of the furnace wall C and its water jacket C', which portions in assembling the device, are connected by means of nipples, or in any other desired manner so as to permit a free circulation of the water throughout the said jacket. The said jacket may be placed in communication with the boiler in any desired manner. Each of the boiler portions of the various sections *f* has therethrough a plurality of flue sections adapted to register with the flue sections of the adjoining sections *f* when the device is assembled. When the various sections *f* are assembled, a continuous air and gas combustion chamber I is formed and a continuous fuel combustion chamber H inclosing said water tubes or legs. In this form of the invention I provide a plurality of small hoppers J each provided with a closure K.

The side face of each of the sections *f* is provided with channels or heat flues *j* through which the gases delivered to the chamber I, pass to the boiler flues or heat areas.

Each of the sections *f* is preferably cast in one integral structure, and the various sections are assembled by any desired means such as stay rods extending from end to end of the apparatus through the various sections. Water may be introduced to the apparatus in any desired manner as through the pipe *k* and the steam or hot water is withdrawn therefrom in any desired manner as through the pipes *m*.

The operation of the specific apparatus herein shown and described is in all of its essentials like the invention broadly claimed in my aforesaid application for re-issue with the exception that instead of being passed below the entire surface of the boiler above the drum F before entering the flues A', the gases are passed through the various vertical flues *j* between each of the sections *f* to the flues or heat areas through the boiler. In this manner, the requisite suction upon the chambers H and I to insure the proper draft is secured; and at the same time, heat units are conserved by increasing the effective heat areas of the boiler, and subjecting them to the gases when at their higher temperatures. At the same time I secure a more effective distribution of the gases and maintain a more uniform condition of the fire bed.

Water is delivered to the apparatus as required through the pipe *k*.

There is also the difference that the heat areas or flues A' are so arranged that the heat gases must traverse the two sets thereof before passing through the smoke pipe B to the chimney or stack.

Having described the invention what I claim as new and desire to have protected by Letters Patent is:—

1. A boiler furnace and fed water heater for steam boilers having a water chamber and heat areas, said boiler furnace and feed water heater comprising a fuel combustion chamber fed from the top having a grate and an ash-pit, a water drum located within the fuel combustion chamber longitudinally thereof with the fuel therein in contact therewith, means for supplying water to the water drum, a set of piping mounted in said fuel combustion chamber with the fuel therein in contact with the exterior of said set of piping and the pipes thereof directly connecting the water drum and the water chamber of the steam boiler, said set of piping forming a chamber for air and gases within it, means for communication between said chamber for air and gases and the heat areas of the steam boiler whereby a suction draft is provided through the chamber for air and gases and a downward draft is provided through the fuel combustion chamber when the fuel combustion chamber is open at its top, doors in the front of the boiler furnace and feed water heater communicating with the chamber for air and gases having dampers, said fuel combustion chamber comprising in cross section the space between the interior of the sides of the boiler furnace and feed water heater and the exterior of said set of piping and the exterior of the sides of the water drum, said grate being located on or above the plane of the water drum and below the lo ends of said set of piping, and said ash-pit being air-tight, the boiler furnace and feed water heater being of sectional construction with means for connecting the sections, each section comprising a portion of the case or side of the boiler furnace and feed water heater, two or more of the pipes of the set of piping a portion of the water drum and an upward extending corrugation on each side of a section forming when the sections are joined together heat flue connections to the heat areas of the steam boiler; substantially as set forth.

2. A boiler furnace and feed water heater for steam boilers formed of a plurality of independent sections, each section comprising a portion of a boiler having a water chamber and heat areas, a portion of a furnace, a portion of a water drum within said furnace portion below said boiler portion, a plurality of water tubes or legs, the opposite ends of which open into the water space within said boiler portion and said drum portion respectively whereby when said sections are assembled, a fuel combustion chamber is formed between the boiler and said legs and the side wall of said furnace, and a gas and air combustion chamber in communication with said fuel combustion chamber intermediate said water tubes or legs, is formed between said water tubes or legs, the boiler and said water drum, means upon the opposite face of each of said sections whereby flues extending from said gas and air combustion chamber to the heat areas of said boiler intermediate adjacent sections are formed, a fuel hopper surmounting and discharging into said fuel combustion chamber, said furnace being closed at the bottom whereby a down draft through said fuel combustion chamber is created and means connecting the boiler portion and the drum portion of each section with the boiler portion and the drum portion of the adjoining section respectively.

3. A boiler furnace and feed water heater for steam boilers formed of a plurality of independent sections, each section comprising a portion of a boiler having a water chamber and heat areas, a portion of a furnace, a portion of a water jacket therefor, a portion of a water drum within said furnace portion below said boiler portion, a plurality of water tubes or legs, the opposite ends of which open into the water space within said boiler portion and said drum portion respectively whereby when said sections are assembled a fuel combustion chamber is formed between the boiler and said legs and the side wall of said furnace, and a gas and air combustion chamber in communication with said fuel combustion chamber intermediate said water tubes or legs, is formed between said water tubes or legs, the boiler and said water drum, means upon the opposite face of each of said sections whereby flues extending from said gas and air combustion chamber to the heat areas of said boiler intermediate adjacent sections, are formed, a fuel hopper surmounting and discharging into said fuel combustion chamber, said furnace being closed at the bottom whereby a down draft through said fuel combustion chamber is created and means connecting the boiler portion, the water jacket portion and the drum portion of each section with the boiler portion the water jacket portion and the drum portion of the adjoining section respectively.

In witness whereof, I hereunto affix my signature in the presence of two subscribing witnesses, this 14th day of September, 1915.

JOHN RALPH SURRELL.

Witnesses:

F. T. WENTWORTH,

CLARICE FRANCK.